United States Patent
Lin

(10) Patent No.: US 12,507,374 B2
(45) Date of Patent: Dec. 23, 2025

(54) FAN ASSEMBLY AND ELECTRONIC DEVICE

(71) Applicants: MICRO-STAR INT'L CO., LTD., New Taipei (TW); MSI ELECTRONIC (KUN SHAN) CO., LTD., Kunshan (CN)

(72) Inventor: Yi-Fen Lin, New Taipei (TW)

(73) Assignees: MICRO-STAR INT'L CO., LTD., New Taipei (TW); MSI ELECTRONIC (KUN SHAN) CO., LTD., Kunshan (CN)

( * ) Notice: Subject to any disclaimer, the term of this patent is extended or adjusted under 35 U.S.C. 154(b) by 210 days.

(21) Appl. No.: 18/376,354

(22) Filed: Oct. 3, 2023

(65) Prior Publication Data

US 2025/0081386 A1 Mar. 6, 2025

Related U.S. Application Data

(63) Continuation of application No. PCT/CN2023/116679, filed on Sep. 4, 2023.

(30) Foreign Application Priority Data

Sep. 4, 2023 (TW) ................................ 112133433

(51) Int. Cl.
*H05K 7/20* (2006.01)
*G06F 1/20* (2006.01)

(52) U.S. Cl.
CPC ......... *H05K 7/20172* (2013.01); *G06F 1/203* (2013.01); *H05K 7/20145* (2013.01); *H05K 7/20418* (2013.01)

(58) Field of Classification Search
CPC .......... G06F 1/203; G06F 1/20; G06F 1/1616; G06F 1/166; G06F 1/206; G06F 2200/201; H05K 7/20172; H05K 7/20145; H05K 7/20336; H05K 7/20154; H05K 7/20; H05K 1/0201; H05K 7/20136; H01L 23/427; H01L 23/467
USPC ........................................................ 361/695
See application file for complete search history.

(56) References Cited

U.S. PATENT DOCUMENTS

| | | | | |
|---|---|---|---|---|
| 2010/0071875 A1* | 3/2010 | Hwang | ............... | F04D 29/4246 415/203 |
| 2020/0159296 A1* | 5/2020 | Zhu | ..................... | H05K 7/20145 |
| 2020/0340493 A1* | 10/2020 | He | ........................ | G06F 1/203 |
| 2020/0396864 A1* | 12/2020 | Ku | ..................... | H05K 7/20309 |

(Continued)

*Primary Examiner* — Mandeep S Buttar
(74) *Attorney, Agent, or Firm* — Maschoff Brennan

(57) ABSTRACT

A fan assembly and an electronic device. The fan assembly includes a casing and an impeller. The casing includes a first cover plate, a side plate and a second cover plate. The side plate is disposed on the first cover plate. The second cover plate is disposed on a side of the side plate. The first cover plate, the side plate and the second cover plate together form a first outlet and a second outlet. The first and second outlet are located on two different sides of the first cover plate, respectively. The second cover plate has an inlet in fluid communication with the first and second outlet. The impeller is rotatably disposed on the first cover plate. The first cover plate has a first notch recessed inwards from a reference plane where the second outlet located, and is connected to the side plate.

9 Claims, 5 Drawing Sheets

(56) References Cited

U.S. PATENT DOCUMENTS

2021/0072805 A1* 3/2021 He ................. H05K 7/20145
2024/0107701 A1* 3/2024 Abdouch .......... H05K 7/20172

* cited by examiner

FAN ASSEMBLY AND ELECTRONIC DEVICE

CROSS-REFERENCE TO RELATED APPLICATIONS

This non-provisional application claims priority under 35 U.S.C. § 119(a) on Patent Application No(s). 112133433 filed in Taiwan, R.O.C. on Sep. 4, 2023, and on Patent Application No(s). PCT/CN2023/116679 filed in WO on Sep. 4, 2023, the entire contents of which are hereby incorporated by reference.

TECHNICAL FIELD

The disclosure relates to an air-cooling unit and an electronic device including the same, more particularly to a fan assembly and an electronic device including the same.

BACKGROUND

Comparing to traditional desktop computers, laptop computers are light, thin and portable and thus have become widely used. In general, in order to effectively dissipate the heat generated by a heat source, at least one fan is usually disposed in the laptop computer. With the fan, a cold air can be blown into the laptop computer by the fan to effectively cool the parts of the laptop computer, such as the heat source and a housing.

However, recently, in order to improve the portability, the laptop computer is designed to be as thin as possible, which reduces the volume of the inner space of the laptop computer. Thus, the inner space is too small to allow the cold air to effectively cool the housing. In this way, the housing is hot, and it is uncomfortable for a user to touch the housing in high temperature during the usage of a keyboard assembly disposed thereon.

SUMMARY

The disclosure provides a fan assembly and an electronic device whose cover body can be effectively cooled and thus the discomfort is prevented during the usage of a keyboard assembly.

One embodiment of this disclosure provides a fan assembly including a casing and an impeller. The casing includes a first cover plate, a side plate and a second cover plate. The side plate is disposed on the first cover plate. The second cover plate is disposed on a side of the side plate that is located farthest away from the first cover plate. The first cover plate, the side plate and the second cover plate together form a first outlet and a second outlet. The first outlet and the second outlet are located on two different sides of the first cover plate, respectively. The second cover plate has an inlet in fluid communication with the first outlet and the second outlet. The impeller is rotatably disposed on the first cover plate. The first cover plate has a first notch. The first notch is recessed inwards from a reference plane where the second outlet located, and is connected to the side plate.

Another embodiment of this disclosure provides an electronic device including a base, a cover body, a motherboard, a heat source, a keyboard assembly and a fan assembly. The cover body is disposed on a side of the base and forms an accommodation space together with the base. The motherboard is disposed in the accommodation space. The heat source is disposed on the motherboard. The keyboard assembly and the cover body are located on a side of the motherboard. The fan assembly includes a casing and an impeller. The casing includes a first cover plate, a side plate and a second cover plate. The side plate is disposed on the first cover plate. The second cover plate is disposed on a side of the side plate that is located farthest away from the first cover plate. The first cover plate, the side plate and the second cover plate together form a first outlet and a second outlet. The first outlet and the second outlet are located on two different sides of the first cover plate, respectively. The second cover plate has an inlet in fluid communication with the first outlet and the second outlet. The impeller is rotatably disposed on the first cover plate. The first cover plate has a first notch. The first notch is recessed inwards from a reference plane where the second outlet located, and is connected to the side plate.

According to the fan assembly and the electronic device disclosed by above embodiments, the first notch is recessed inwards from the reference plane where the second outlet located, and is connected to the side plate. Thus, the cooling airflow blown by the impeller flows from the second outlet to the space between the cover body and the motherboard via the first notch. Accordingly, extra airflow flows to the space between the cover body and the motherboard, and thus the heat accumulated in the space between the cover body and the motherboard is effectively dissipated. In this way, the cover body is effectively cooled, thereby preventing the discomfort during the usage of the keyboard assembly disposed thereon.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
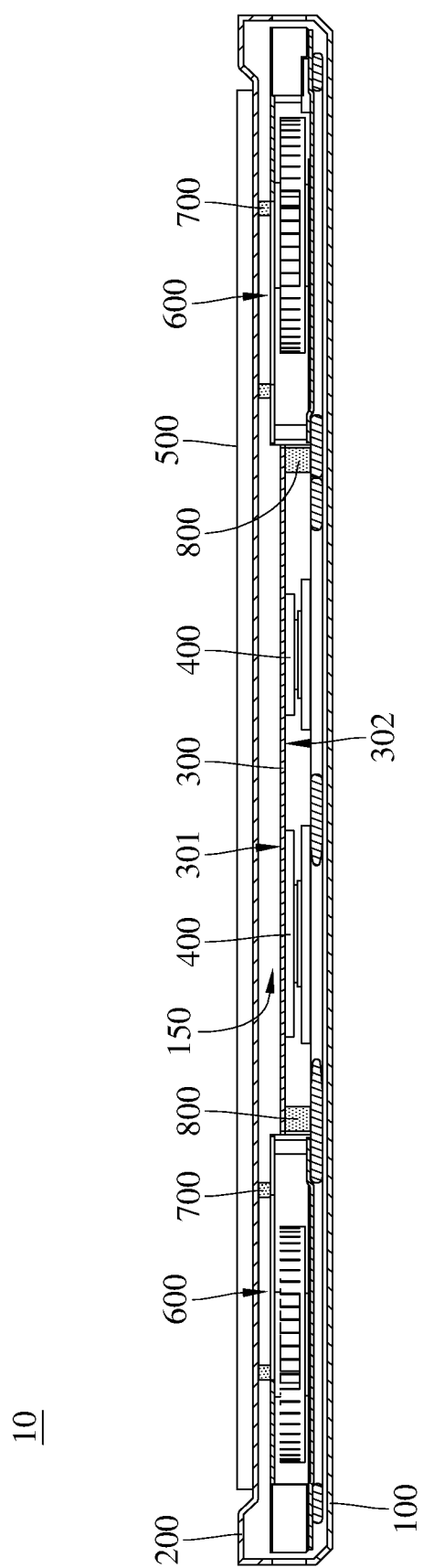
FIG. 1 is a side cross-sectional view of an electronic device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
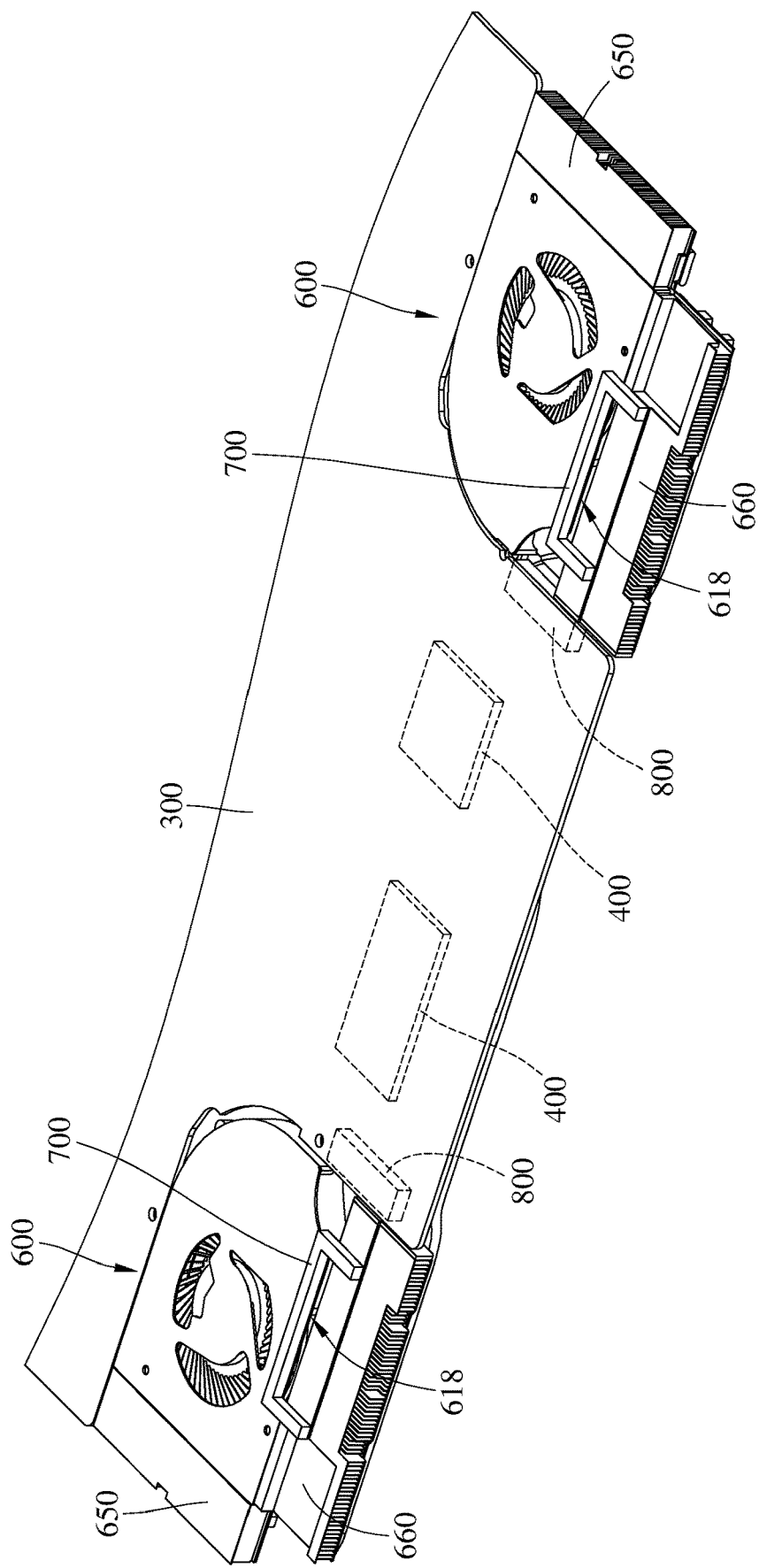
FIG. 2 is a perspective view of the electronic device in FIG. 1 with a base and a cover body being omitted.

Please refer to FIGS. 1 and 2. FIG. 1 is a side cross-sectional view of an electronic device 10 according to one embodiment of the disclosure. FIG. 2 is a perspective view of the electronic device 10 in FIG. 1 with a base 100 and a cover body 200 being omitted. The electronic device 10 is, for example, a host of a laptop computer. In this embodiment, the electronic device 10 includes the base 100, the cover body 200, a motherboard 300, two heat sources 400, a keyboard assembly 500, two fan assemblies 600, two first fin assemblies 650, two second fin assemblies 660, two air guiding components 700 and two air guiding components 800.

The base 100 is, for example, a so-called "D cover" or "D shell". The cover body 200 is, for example, a so-called "C cover" or "C shell". The cover body 200 is disposed on a side of the base 100, and forms an accommodation space 150 together with the base 100.

The motherboard 300 is disposed in the accommodation space 150. In this embodiment, the motherboard 300 has a top surface 301 and a bottom surface 302 facing away from each other. The top surface 301 faces the cover body 200. The two heat sources 400 are, for example, central processing units (CPUs) or graphic processing units (GPUs). The two heat sources 400 are electrically connected to the motherboard 300, and are disposed on the bottom surface 302. The keyboard assembly 500 is electrically connected to the motherboard 300. The keyboard assembly 500 and the cover body 200 are located on the same side of the motherboard 300.

One fan assembly 600, one first fin assembly 650, one second fin assembly 660, one air guiding component 700 and one air guiding component 800 that correspond to one another configure a heat dissipation assembly (not labeled). The two heat dissipation assemblies in this embodiment are configured to dissipate the heat generated by the two heat sources 400 out of the electronic device 10, respectively. Since the two heat dissipation assemblies are similar in structure, only one heat dissipation assembly will be described in detail hereinafter.

Figure 3:
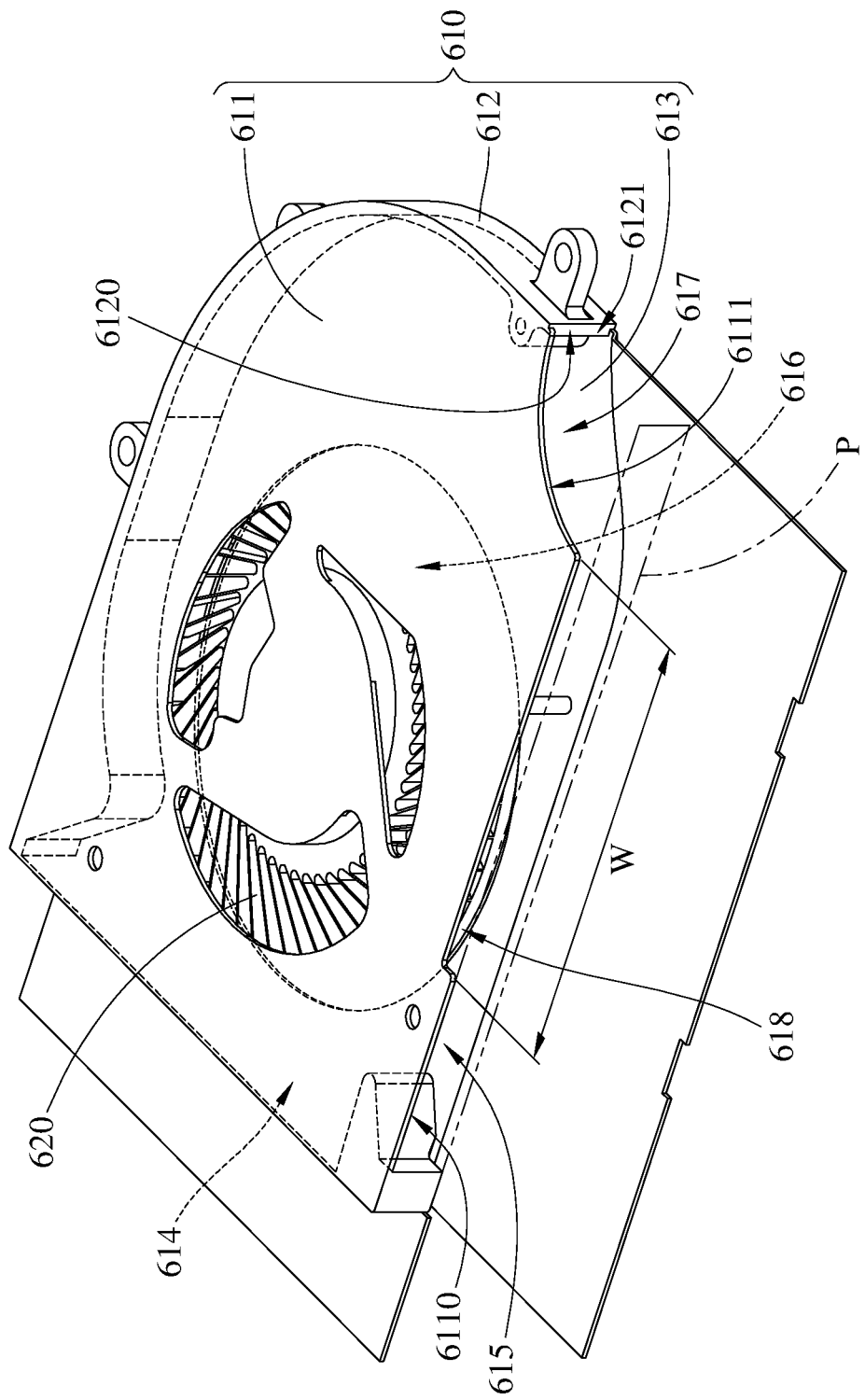
FIG. 3 is a perspective view of a fan assembly of the electronic device in FIG. 1.

Please refer to FIGS. 2 and 3. FIG. 3 is a perspective view of the fan assembly 600 of the electronic device 10 in FIG. 1. The fan assembly 600 includes a casing 610 and an impeller 620. The casing 610 includes a first cover plate 611, a side plate 612 and a second cover plate 613. The side plate 612 is disposed on the first cover plate 611. The second cover plate 613 is disposed on a side of the side plate 612 that is located farthest away from the first cover plate 611. The first cover plate 611, the side plate 612 and the second cover plate 613 together form a first outlet 614 and a second outlet 615. The first outlet 614 and the second outlet 615 are located on two different sides of the first cover plate 611, respectively. The first cover plate 611 has a first notch 617. The first notch 617 is recessed inwards from a reference plane P where the second outlet 615 located, and is connected to the side plate 612. The second cover plate 613 has an inlet 616 that is in fluid communication with the first outlet 614 and the second outlet 615. The impeller 620 is rotatably disposed on the first cover plate 611.

In this embodiment, a side edge 6111 of the first cover plate 611 forming the first notch 617 is in an arc shape, thereby facilitating the manufacture of the first cover plate 611. However, the disclosure is not limited to the shape of the side edge 6111. In other embodiments, the side edge may be in a right-angle shape.

In addition, in this embodiment, the first cover plate 611 further has a second notch 618. The second notch 618 is recessed inwards from the reference plane P. Two opposite sides of the first notch 617 are connected to the side plate 612 and the second notch 618, respectively. A width W of the second notch 618 is, for example, 37 millimeters (mm).

In addition, in this embodiment, the side plate 612 has a side edge 6120. The side edge 6120 is connected to the first notch 617. A side notch 6121 is formed between the side edge 6120 and the reference plane P. In this embodiment, the second outlet 615, the first notch 617, the second notch 618 and the side notch 6121 together form, for example, a large outlet (not labeled).

The first fin assembly 650 and the second fin assembly 660 are disposed on the motherboard 300. The first fin assembly 650 and the second fin assembly 660 are disposed adjacent to the first outlet 614 and the second outlet 615, respectively.

The air guiding component 700 is disposed on a side of the first cover plate 611 that is located farthest away from the second cover plate 613, and covers at least a part of the second notch 618.

The air guiding component 800 is disposed on the bottom surface 302 of the motherboard 300, and is located between the corresponding heat source 400 and the fan assembly 600.

Figure 4:
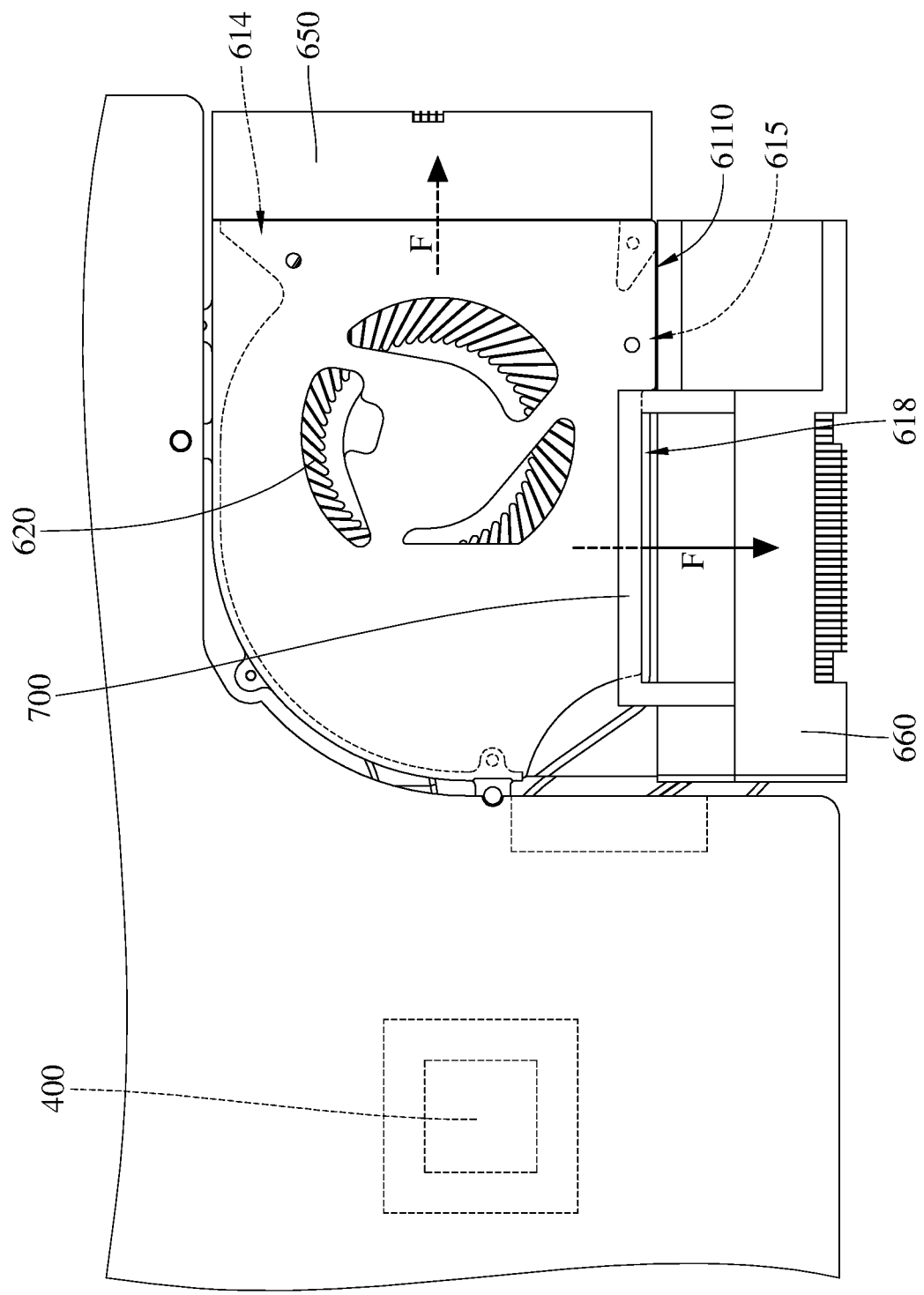
FIG. 4 is a partially enlarged top view of the electronic device in FIG. 1 with the base and the cover body being omitted.
Figure 5:
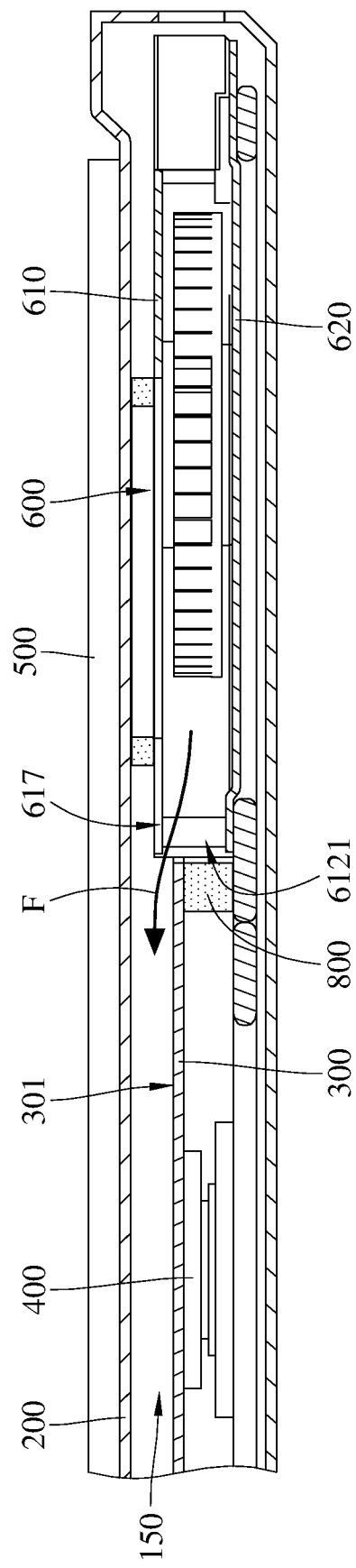
FIG. 5 is a partially enlarged view of the electronic device in FIG. 1.

Please refer to FIGS. 3 to 5. FIG. 4 is a partially enlarged top view of the electronic device 10 in FIG. 1 with the base 100 and the cover body 200 being omitted. FIG. 5 is a partially enlarged view of the electronic device 10 in FIG. 1.

As shown in FIG. 4, the impeller 620 is configured to blow a cooling airflow F to the first fin assembly 650 and the second fin assembly 660 via the first outlet 614 and the second outlet 615, respectively. With the second notch 618, extra cooling airflow F flows to the second fin assembly 660, and thus the heat generated by the heat sources 400 is transferred to the second fin assembly 660 more efficiently. In addition, with the air guiding component 700 covering at least a part of the second notch 618, the cooling airflow F flows to the second fin assembly 660 in a more concentrated manner, and thus the heat generated by the heat sources 400 is transferred to the second fin assembly 660 more efficiently. Note that in other embodiments where the heat sources generated less heat, the first cover plate may not have the second notch 618, and the electronic device may not include the air guiding component 700.

Further, as shown in FIGS. 3 and 4, in this embodiment, a side edge 6110 of the first cover plate 611 forming the second outlet 615 is, for example, in contact with the second fin assembly 660. Thus, the cooling airflow F flowing to the second fin assembly 660 is prevented from further flowing to a hinge (not shown), thereby preventing the cooling airflow F from accelerating the evaporation of the lubricant on the hinge.

As shown in FIG. 5, the air guiding component 800 is configured to guide the cooling airflow F flowing out of the first notch 617 and the side notch 6121 to a space between the top surface 301 of the motherboard 300 and the cover body 200. That is, the air guiding component 800 allows the cooling airflow F to flow into the space between the top surface 301 of the motherboard 300 and the cover body 200 in a more concentrated manner. In other embodiments where the heat sources generate less heat, the electronic device may not include the air guiding component 800.

Moreover, as shown in FIG. 5, in this embodiment, the first cover plate 611 is located closer to the cover body 200 than the second cover plate 613. Therefore, the cooling airflow F is facilitated to flow from the second outlet 615 of the first cover plate 611 to the space between the top surface 301 of the motherboard 300 and the cover body 200. However, in other embodiments where the heat sources generate less heat, the first cover plate may be located farther away from the cover body than the second cover plate.

According to the fan assembly and the electronic device disclosed by above embodiments, the first notch is recessed inwards from the reference plane where the second outlet located, and is connected to the side plate. Thus, the cooling airflow blown by the impeller flows from the second outlet to the space between the cover body and the motherboard via the first notch. Accordingly, extra airflow flows to the space between the cover body and the motherboard, and thus the heat accumulated in the space between the cover body and the motherboard is effectively dissipated. In this way, the cover body is effectively cooled, thereby preventing the discomfort during the usage of the keyboard assembly disposed thereon.

Additionally, according to the experimental results, with the first notch 617, the second notch 618, the side notch 6121 and the air guiding component 800, the temperature of the hottest spot on the cover body 200 is reduced by 7 degrees Celsius.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fan assembly, comprising:
   a casing, comprising a first cover plate, a side plate and a second cover plate, wherein the side plate is disposed on the first cover plate, the second cover plate is disposed on a side of the side plate that is located farthest away from the first cover plate, the first cover plate, the side plate and the second cover plate together form a first outlet and a second outlet, the first outlet and the second outlet are located on two different sides of the first cover plate, respectively, and the second cover plate has an inlet in fluid communication with the first outlet and the second outlet; and
   an impeller, rotatably disposed on the first cover plate;
   wherein the first cover plate has a first notch, and the first notch is recessed inwards from a reference plane where the second outlet located, and is connected to the side plate;
   wherein the side plate has a side edge connected to the first notch, and a side notch is formed between the side edge and the reference plane.

2. The fan assembly according to claim 1, wherein a side edge of the first cover plate forming the first notch is in an arc shape.

3. The fan assembly according to claim 1, wherein the first cover plate further has a second notch, the second notch is recessed inwards from the reference plane, and two different sides of the first notch are connected to the side plate and the second notch, respectively.

4. An electronic device, comprising:
   a base;
   a cover body, disposed on a side of the base and forming an accommodation space together with the base;
   a motherboard, disposed in the accommodation space;
   a heat source, disposed on the motherboard;
   a keyboard assembly, wherein the keyboard assembly and the cover body are located on a side of the motherboard; and
   a fan assembly, comprising:
      a casing, comprising a first cover plate, a side plate and a second cover plate, wherein the side plate is disposed on the first cover plate, the second cover plate is disposed on a side of the side plate that is located farthest away from the first cover plate, the first cover plate, the side plate and the second cover plate together form a first outlet and a second outlet, the first outlet and the second outlet are located on two different sides of the first cover plate, respectively, and the second cover plate has an inlet in fluid communication with the first outlet and the second outlet; and
      an impeller, rotatably disposed on the first cover plate;
   wherein the first cover plate has a first notch, and the first notch is recessed inwards from a reference plane where the second outlet located, and is connected to the side plate;
   wherein the side plate has a side edge connected to the first notch, and a side notch is formed between the side edge and the reference plane.

5. The electronic device according to claim 4, further comprising a first fin assembly and a second fin assembly disposed on the motherboard, wherein the first cover plate further has a second notch, the second notch is recessed inwards from the reference plane, two different sides of the first notch are connected to the side plate and the second notch, respectively, the first fin assembly and the second fin assembly are disposed adjacent to the first outlet and the second outlet, respectively, and the impeller is configured to blow a cooling airflow to the first fin assembly and the second fin assembly via the first outlet and the second outlet, respectively.

6. The electronic device according to claim 5, further comprising an air guiding component, wherein the air guiding component is located on a side of the first cover plate that is located farthest away from the second cover plate, and covers at least a part of the second notch.

7. The electronic device according to claim 5, wherein a side edge of the first cover plate forming the second outlet is in contact with the second fin assembly.

8. The electronic device according to claim 4, further comprising an air guiding component, wherein the motherboard has a top surface and a bottom surface facing away from each other, the top surface faces the cover body, the heat source is disposed on the bottom surface of the motherboard, the air guiding component is disposed on the bottom surface of the motherboard, and located between the heat source and the fan assembly, and the air guiding component is configured to guide a cooling airflow flowing out of the second outlet to a space between the top surface of the motherboard and the cover body.

9. The electronic device according to claim 4, wherein the first cover plate is located closer to the cover body than the second cover plate.

\* \* \* \* \*